Patented Feb. 4, 1941

2,230,962

UNITED STATES PATENT OFFICE 2,230,962

PRODUCTION OF AMINOTHIAZOLE

Leonard Christie Leitch and Leo Brickman, Montreal, Quebec, Canada, assignors to Mallinckrodt Chemical Works Limited, Montreal, Quebec, Canada No Drawing. Application October 7, 1940, Serial No. 360,126

6 Claims. (Cl. 260—302)

This invention relates to the production of 2-aminothiazole and is particularly directed to an economical method of producing a pure product with high yield.

In carrying out the method paraldehyde is treated with bromine to produce tribromparaldehyde which is reacted with thiourea in the presence of water, alcohols, ketones or such solvents. The solution is neutralized with alkali carbonate, ammonium hydroxide or the like to liberate aminothiazole which is then extracted with a suitable solvent, such as ether or ethyl acetate, or the reaction mixture may be evaporated, under vacuum, to small volume or even to dryness, then treated with the alkali and extracted as stated.

The following is illustrative of the detail operation of the invention:

To one part by volume of paraldehyde there is gradually added an equal volume of bromine, while the mixture is well stirred, and the temperature of the reacting mass is maintained below 15° C. The preferred temperature is 5 to 10° C. When the reaction is complete the tribromparaldehyde formed is passed in a fine stream into a suspension of 1.75 parts by weight of thiourea in 5 parts of water, or other solvent, while the mixture is stirred or agitated to insure uniformity in the mass. The temperature rises to 80 to 90° C. and stirring is continued until the solution becomes clear. The solution is boiled gently until the odour of bromacetaldehyde has disappeared. It is then made alkaline by the addition of sodium carbonate to form the aminothiazole which is extracted with ether or other suitable solvent. On the basis of the thiourea the yield of crude aminothiazole is 65 to 70%.

To obtain a highly pure aminothiazole the product is sublimed at 85 to 90° C. under vacuum giving a yield of 85 to 90%.

As previously indicated, the solution, after gentle boiling, may be evaporated under vacuum to reduce the volume before neutralizing with the alkali carbonate. The alkali metal carbonates, alkaline earth metal carbonates and ammonium carbonate and the hydroxides of ammonia and the alkali metals may be used. When, however, the alkali metal hydroxides are used, the solution is rendered neutral therewith and a carbonate is added to render the solution alkaline to complete the reaction and form the 2-aminothiazole.

We claim:

1. A method for the production of aminothiazole which comprises reacting paraldehyde with bromine at a temperature below 15° C. and adding the reaction product to thiourea in the presence of a solvent.

2. A method for the production of aminothiazole which comprises reacting paraldehyde with an equal volume of bromide at a temperature below 15° C., passing the reaction product with efficient stirring into a suspension of thiourea in an aqueous solvent, when the reaction is complete gently boiling the mass and rendering the mass alkaline to liberate aminothiazole.

3. A method as set forth in claim 2 wherein the aminothiazole is extracted with ether.

4. A method as set forth in claim 1 wherein the solution following reaction with the thiourea is concentrated by evaporation under vacuum, treated with sodium carbonate and extracted with a solvent for the aminothiazole.

5. In the production of 2-aminothiazole the steps which comprise passing tribromparaldehyde into thiourea in the presence of an aqueous solvent, when the reaction is complete gently boiling the mass and rendering the same alkaline to form the aminothiazole.

6. A method as set forth in claim 5, wherein the aminothiazole is extracted and subjected to sublimation under vacuum at 85 to 90° C.

LEONARD CHRISTIE LEITCH.
LEO BRICKMAN.